United States Patent
Caldwell et al.

(10) Patent No.: US 8,100,161 B2
(45) Date of Patent: Jan. 24, 2012

(54) INFRARED PLASTIC WELDING WITH RECIRCULATION OF UNABSORBED INFRARED LASER LIGHT TO INCREASE ABSORPTION OF INFRARED LASER LIGHT

(75) Inventors: Scott Caldwell, Henrietta, NY (US); Paul Rooney, Henrietta, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 508 days.

(21) Appl. No.: 12/114,847

(22) Filed: May 5, 2008

(65) Prior Publication Data

US 2008/0272521 A1    Nov. 6, 2008

Related U.S. Application Data

(60) Provisional application No. 60/927,898, filed on May 4, 2007.

(51) Int. Cl.
*B29C 35/08* (2006.01)
(52) U.S. Cl. .................................. 156/380.9; 156/379.6
(58) Field of Classification Search ............... 156/272.2, 156/272.8, 379.6, 380.9, 293, 294
See application file for complete search history.

(56) References Cited

U.S. PATENT DOCUMENTS

| | | | | |
|---|---|---|---|---|
| 5,115,761 A * | 5/1992 | Hood | ............................ | 118/641 |
| 5,225,244 A * | 7/1993 | Aharoni et al. | ............... | 427/240 |
| 5,595,620 A * | 1/1997 | Takei | ............................ | 156/64 |
| 6,002,110 A * | 12/1999 | Sikka et al. | ................... | 219/411 |
| 6,528,755 B2 | 3/2003 | Grewell et al. | | |
| 6,713,713 B1 | 3/2004 | Caldwell et al. | | |
| 6,858,104 B2 | 2/2005 | Flanagan | | |
| 7,343,218 B2 | 3/2008 | Caldwell et al. | | |
| 2002/0100540 A1* | 8/2002 | Savitski et al. | ............... | 156/157 |
| 2003/0221785 A1* | 12/2003 | Yu | ............... | 156/380.9 |
| 2004/0035524 A1 | 2/2004 | Link | | |
| 2004/0238110 A1* | 12/2004 | Flanagan | ................... | 156/272.8 |
| 2005/0121424 A1 | 6/2005 | Caldwell et al. | | |
| 2005/0205534 A1 | 9/2005 | Caldwell | | |
| 2006/0219675 A1 | 10/2006 | Caldwell et al. | | |
| 2007/0047932 A1 | 3/2007 | Caldwell et al. | | |

OTHER PUBLICATIONS

International Search Report and Written Opinion for PCT/US2008/05766, mailed Aug. 6, 2008.

* cited by examiner

*Primary Examiner* — Richard Crispino
*Assistant Examiner* — Daniel McNally
(74) *Attorney, Agent, or Firm* — Harness, Dickey & Pierce, P.L.C.

(57) ABSTRACT

Unabsorbed infrared laser light that has passed though plastic parts to be welded with a low absorption TTIr process is recirculated back to the low absorption weld interface for reabsorption in the process. A beam of infrared laser light is directed at the plastic parts to be welded, a transmissive first part and an absorptive (or partially absorptive) second part. The infrared laser light impinges the transmissive part and first transits through the transmissive part to be welded to a weld interface at the junction of the two parts. At the weld interface, either the infrared laser light is partially absorbed by an additive infrared absorber, the infrared laser light is partially absorbed by the absorptive part, or both. The portion of the infrared laser light that is not absorbed continues through the absorptive part and exits the far side. This infrared laser light is then redirected back to the weld interface.

4 Claims, 4 Drawing Sheets

INFRARED PLASTIC WELDING WITH RECIRCULATION OF UNABSORBED INFRARED LASER LIGHT TO INCREASE ABSORPTION OF INFRARED LASER LIGHT

CROSS-REFERENCE TO RELATED APPLICATIONS

This application claims the benefit of U.S. Provisional Application No. 60/927,898 for Photon Recirculator For Plastics Welding And Method Of Plastic Welding filed on May 4, 2007. The disclosure of the above application is incorporated herein by reference.

FIELD

The present disclosure relates to plastic welding, and more particularly to laser welding of plastic parts.

BACKGROUND

Laser welding is commonly used to join plastic or resinous parts, such as thermoplastic parts, at a welding zone. An example of such use of lasers can be found in U.S. Pat. No. 4,636,609, which is expressly incorporated herein by reference.

As is well known, lasers provide a semi-focused beam of electromagnetic radiation at a specified frequency (i.e., coherent monochromatic radiation). There are a number of types of lasers available; however, infrared lasers or non-coherent sources provide a relatively economical source of radiative energy for use in heating a welding zone. One particular example of infrared welding is known as Through-Transmission Infrared (TTIr) Welding. TTIr welding employs an infrared laser capable of producing infrared radiation that is directed by lenses, diffractive optics, fiber optics, waveguides, lightpipes, or lightguides through a first plastic part and into a second plastic part. This first plastic part is often referred to as the transmissive piece, since it generally permits the laser beam from the laser to pass therethrough. However, the second plastic part is often referred to as absorptive piece, since this piece (and/or an absorbtive additive at the weld interface) generally absorbs the radiative energy of the laser beam to produce heat in the welding zone. This heat in the welding zone causes the transmissive piece and the absorptive piece to be melted and, with intimate contact, welded together.

With reference to FIGS. 1A and 1B, typical through transmission infrared (TTIr) systems 100 and 100' for laser welding of plastics are shown. A beam of infrared laser light 102 from a source of infrared laser light 104 is directed to the plastic parts 106, 108 to be welded. The infrared laser light passes through transmissive plastic part 106 to a weld interface 110 at a junction of transmissive plastic part and absorptive plastic part 108. Weld interface 110 is also sometimes referred to in the art as a weld site, a weld region or a weld area. An infrared absorber additive 112 may be provided at weld interface 110 (FIG. 1A) The absorption of the laser light heats up the weld interface at the junction of the parts 106, 108, melting the plastic in both parts 106, 108 at the weld interface 110. The laser light is removed, such as by turning laser source 102 off, after an appropriate period of time and the molten plastic at weld interface 110 then cools, thus welding the two plastic parts 106, 108 together.

Oftentimes, the absorptive second plastic part 108, or the infrared absorber additive 112 used at the weld interface 110, are relatively low absorbers of the infrared light. A large portion, indicated at 114, of the infrared laser light 102 then passes though both parts 106, 108 and out of part 108 becoming wasted in the process.

With low absorbers, either too low a laser energy is delivered to the weld interface 110 to make a weld, or relatively high laser energies need to be used to translate into enough energy at the weld interface 110 to make a weld.

SUMMARY

In accordance with an aspect of the present disclosure, unabsorbed infrared laser light that has passed though plastic parts to be welded with a low absorption TTIr process is recirculated back to the low absorption weld interface for reabsorption in the process. A beam of infrared laser light is directed at the plastic parts to be welded, a transmissive first part and an absorptive (or partially absorptive) second part. The infrared laser light impinges the transmissive part and first transits through the transmissive part to be welded to a weld interface at the junction of the two parts. At the weld interface, either the infrared laser light is partially absorbed by an additive infrared absorber, the infrared laser light is partially absorbed by the absorptive part, or both. The portion of the infrared laser light that is not absorbed continues through the absorptive part and exits the far side. This infrared laser light is then redirected back to the weld interface. On the second pass (and any subsequent passes thereafter), more infrared laser light is absorbed in the partially absorbing medium (the additive infrared absorber, the absorptive part, or both).

In an aspect, the parts are tubular parts with the transmissive part coaxially surrounding the absorptive part. The infrared laser light is redirected with a cylindrical mirror that coaxially surrounds the tubular parts.

In an aspect, the cylindrical mirror redirects the infrared laser light so that the infrared laser light eventually impinges the tubular parts from all directions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 5:
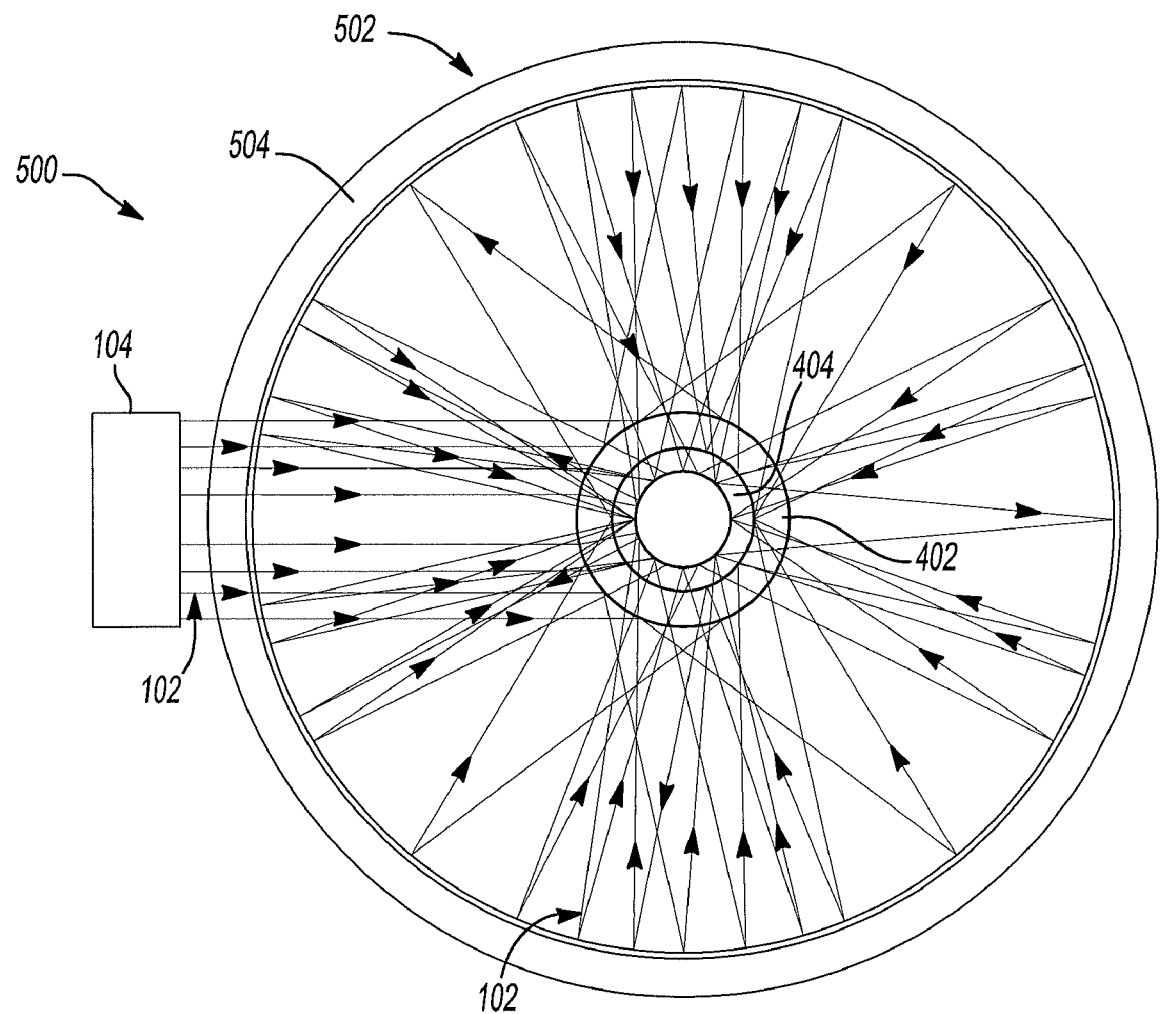
Figure 6:
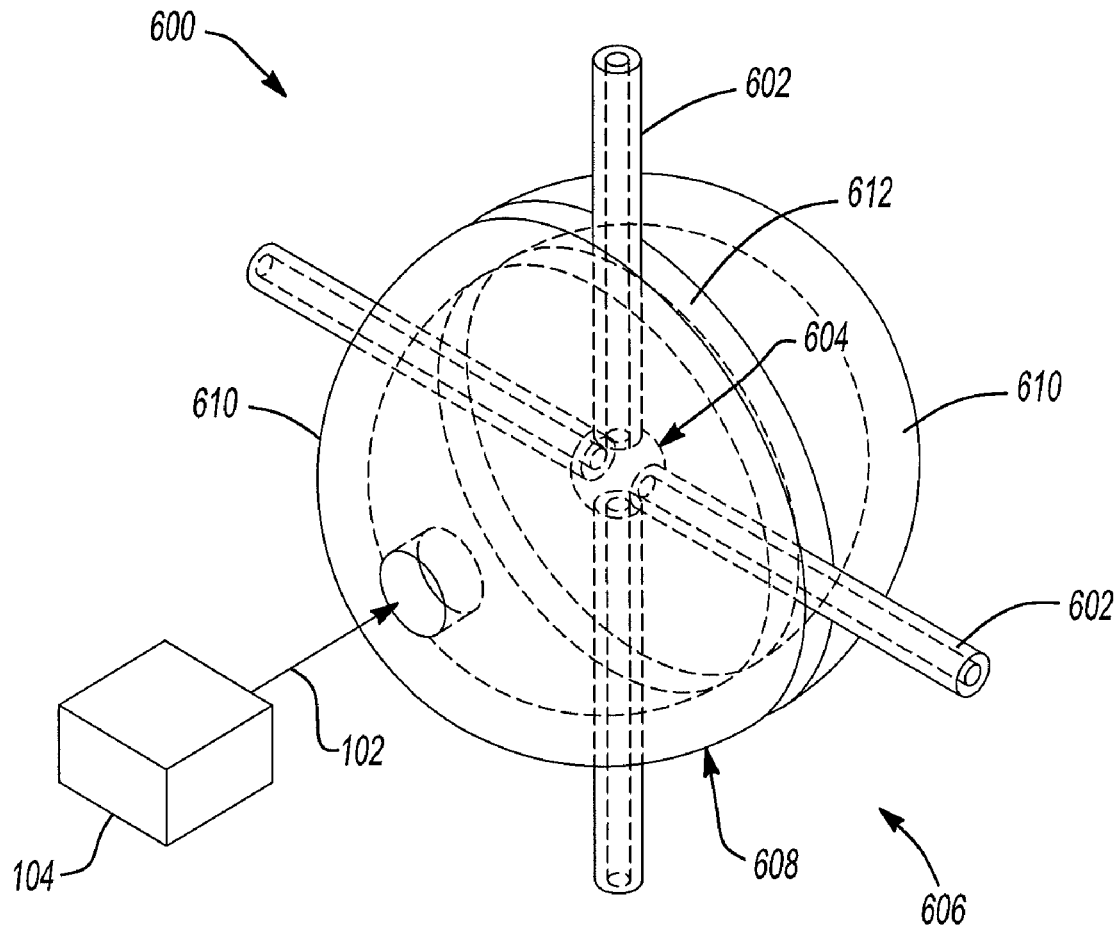

FIG. 5 is a schematic illustration of a low absorption TTIr laser welding system welding tubular parts in which unabsorbed infrared laser light is recirculated to the tubular parts; and FIG. 6 is a schematic illustration of a low absorption TTIr laser welding system welding tubular parts in which one of the tubular parts is a fitting in which unabsorbed infrared laser light is recirculated to the parts.

DETAILED DESCRIPTION

The following description is merely exemplary in nature and is not intended to limit the present disclosure, application, or uses. It should be understood that throughout the drawings, corresponding reference numerals indicate like or corresponding parts and features.

In accordance with an aspect of the present disclosure, unabsorbed infrared laser light that has passed though plastic parts to be welded with a low absorption TTIr process is recirculated back to the low absorption weld interface for reabsorption in the process. A beam of infrared laser light is directed at the plastic parts to be welded, a transmissive first part and an absorptive (or partially absorptive) second part. The infrared laser light impinges the transmissive part and first transits through the transmissive part to be welded to the weld interface at the junction of the two parts. At the weld interface, either the infrared laser light is partially absorbed by an additive infrared absorber, the infrared laser light is partially absorbed by the absorptive part, or both.

The portion of the infrared laser light that is not absorbed continues through the absorptive part and exits the far side. This infrared laser light is then redirected back to the weld interface either by using mirrors, waveguides, or fiber optics. On the second pass, more infrared laser light is absorbed in the partially absorbing medium (the additive infrared absorber, the absorptive part, or both).

Again, with the second pass, some infrared laser light will not be absorbed, and will pass through the parts to be welded. This infrared laser light again can be redirected back to the weld interface. This process can be repeated any number of times, and in some variants, can have an infinite repetition. Even with a low absolute infrared laser light absorption ratio of the parts on each pass, eventually a high percentage of infrared laser light will be absorbed at the weld interface.

Figure 2:
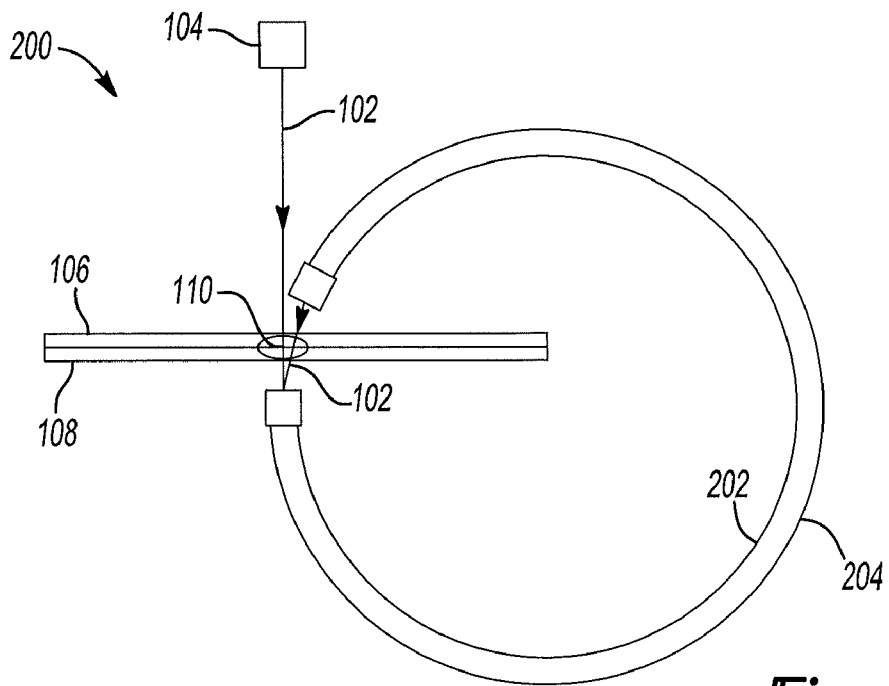
FIG. 2 is a schematic illustration of a low absorption TTIr laser welding system having an infinite loop for redirection of infrared laser light through a weld interface between the parts to be welded in accordance with an aspect of the present disclosure.

When the infrared laser light is redirected at the parts to be welded, it can be redirected in the same direction as the original impinging light, or can be redirected at from some other angle that points towards the weld region. FIG. 2 shows a laser welding system 200 having a photon recirculator 202 having an infinite loop. In the illustrative embodiment shown in FIG. 2, infinite photon recirculator includes a fiber optic loop 204 that extends from where the infrared laser light exits absorptive part 108 back to where the laser light originally impinges on transmissive part 106. By redirecting the infrared laser light in the same direction as the infrared laser light 102 originally impinged on the transmissive part directly from the source 104 of laser light 102, an infinite loop is set up as shown in FIG. 2.

Figure 3:
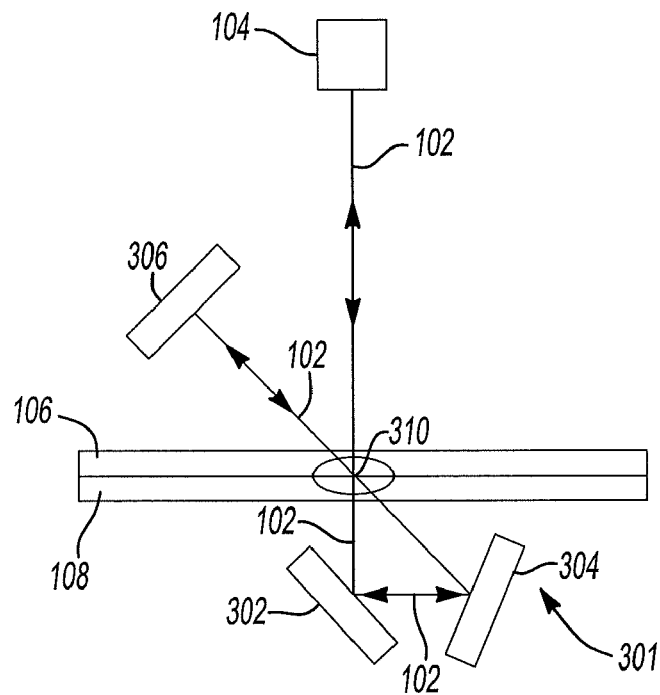
FIG. 3 is a schematic illustration of a low absorption TTIr laser welding system having a an infinite loop for multiple path redirection of infrared laser light through a weld interface in accordance with an aspect of the present disclosure.

In a variation, the infrared laser light is redirected to the weld interface from another angle, that is, redirected to the weld interface in a direction different than the direction of the original impinging infrared laser light. In this variation, multiple pass angles are illustratively set up as shown in FIG. 3 and the path of the infrared laser light can be redirected by one or more mirrors to provide a photon recirculator 301 that provides two or more passes of the infrared laser light 102 through the weld interface 110. In the illustrative embodiment shown in FIG. 3, laser welding system 300 includes a plurality of mirrors, such as three mirrors 302, 304, 306. A beam of infrared laser light 102 is directed to parts 106, 108 to be welded. The infrared laser light 102 first transits through transmissive part 106 to weld interface 110. The portion of infrared laser light 102 that is not absorbed is reflected by mirror 302 to mirror 304, by mirror 304 back through parts 106, 108 where it passes through weld interface 110. The unabsorbed portion of infrared laser light 102 reflected by mirror 304 exiting transmissive part 106 is reflected by mirror 306 back through parts 106, 108 where it passes through weld interface 110. The unabsorbed portion of infrared laser light 102 reflected by mirror 306 is reflected by mirror 304 to mirror 302 which reflects it back through parts 106, 108 where it passes through weld interface 110. In the embodiment of FIG. 3, infrared laser light 102 makes four passes through parts 106, 108 and weld interface 110.

Figure 4:
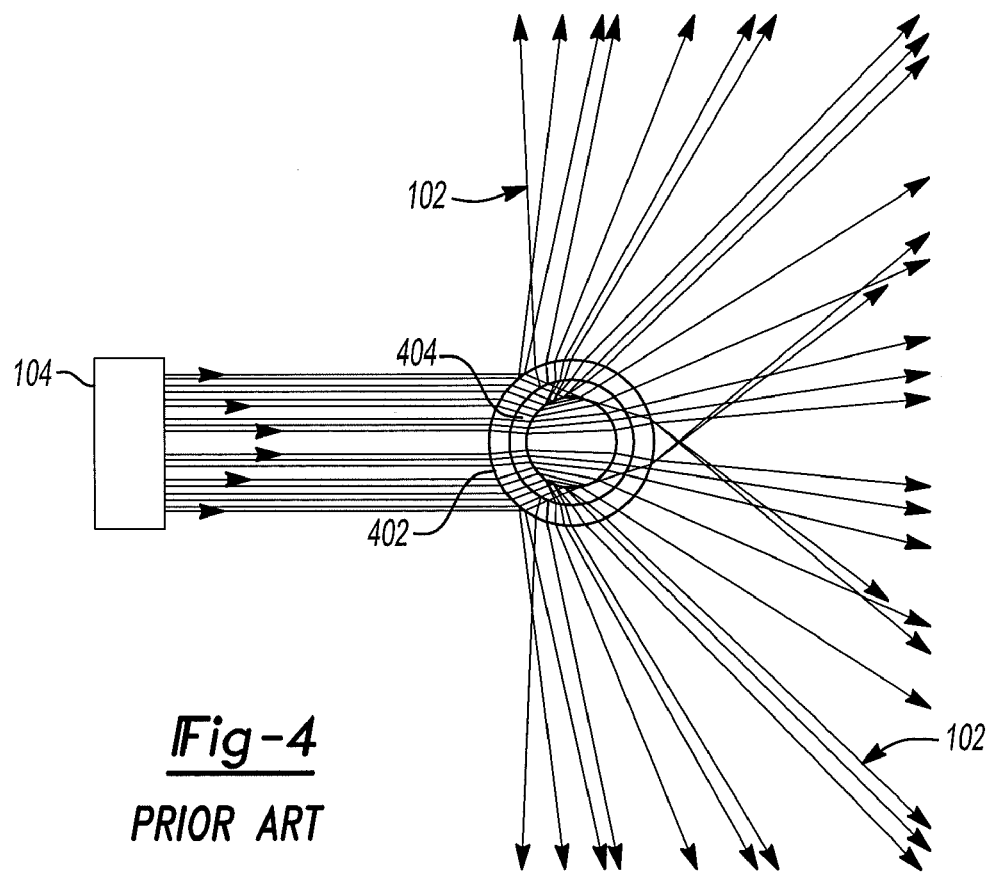
FIG. 4 is a schematic illustration of prior art dispersion of infrared laser light in a low absorption TTIr laser welding system welding tubular parts.

With reference to FIG. 4, for tubular plastic parts, the infrared laser light 102 impinging on the tubular parts 402, 404 refracts as if the tubular parts 402, 404 form a lens as the infrared laser light passes through the parts 402, 404. This fans out the infrared laser light 102 in an approximate half circle on the opposite side that the infrared laser light 102 first impinged on outer part 402, as seen in FIG. 4. Illustratively, part 402 is the transmissive plastic part and coaxially surrounds part 404, which is the absorptive plastic part.

Figure 1A:
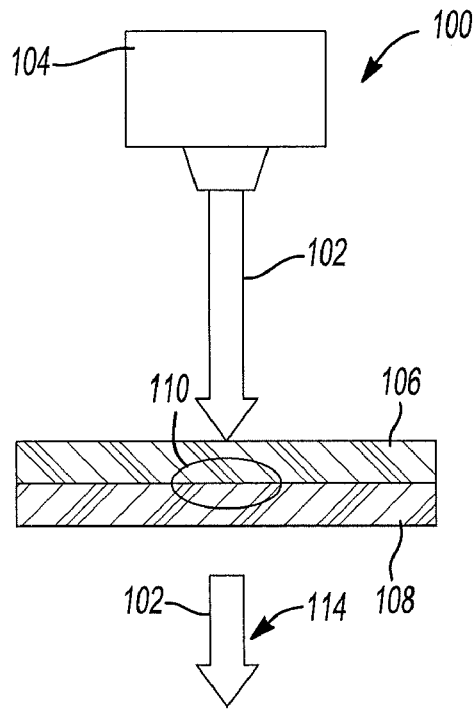
FIGS. 1A and 1B are schematic illustrations of prior art low absorption TTIr laser welding systems for welding plastic parts with infrared laser light.
Figure 1B:
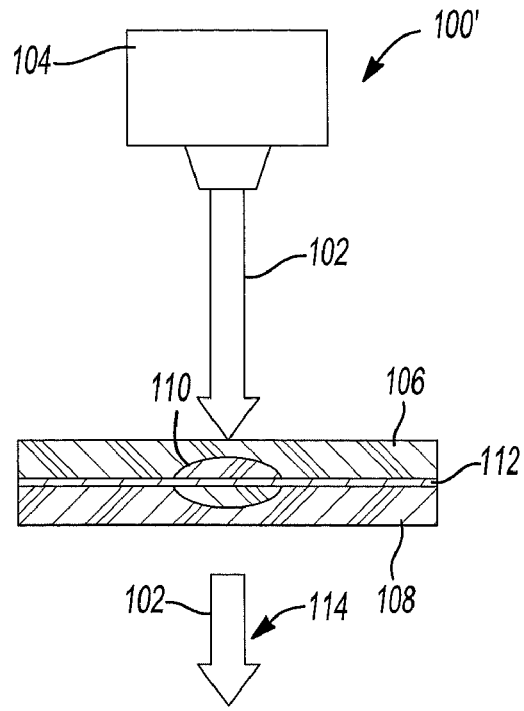

FIG. 5 shows a laser welding system 500 having a photon recirculator 502 that recirculates the fanned out infrared laser light 102 back to the parts 402, 404 to be welded. In the embodiment of FIG. 5, photon recirculator 502 includes a cylindrical mirror 504 disposed coaxially around the tubular parts 402, 404. Illustratively, cylindrical mirror 504 includes an opening in which infrared laser light 102 is directed by infrared laser light source 104. Cylindrical mirror 504 reflects the fanned out infrared laser light 102 to recirculate the fanned out infrared laser light back to the tubular parts 402, 404. Cylindrical mirror 504 has a geometry that continues to recirculate the laser light so that eventually the infrared laser light impinges from all directions around the tubular parts 402, 404 to be welded as seen in FIG. 5. Eventually, most of the laser light 102 is absorbed by the low absorption absorbers used in the welding process, which is the absorptive plastic part 404, an infrared absorber additive such as infrared absorber additive 112 (FIG. 1) disposed at a junction of tubular parts 402, 404, or both.

It should be understood that cylindrical mirror 504 need not be a continuous cylinder. For example, cylindrical mirror 504 may include slots to facilitate the use of a conveyor system to move tubular parts 402, 404 into and out of cylindrical mirror 504.

FIG. 6 shows a laser welding system 600 for use in welding tubular parts 602, 604 in which tubular part 604 is a fitting, such as a junction, elbow, union, or the like. Illustratively, ends of tubular parts 602 are received in fitting 604. Where surfaces of parts 602, 604 abut each other is the weld interface in this illustrative embodiment. Fitting 604 may illustratively be the transmissive part and tubular parts 602 the absorptive parts. It should be understood that tubular parts 602 could be the transmissive parts and fitting 604 the absorptive part, in which case fitting 604 may illustratively be received in ends of fitting 602. It should also be understood that an infrared absorber additive could be disposed at the weld interface interface(s) between tubular parts 602 and junction 604.

Laser welding system 600 includes a photon recirculator 606 that recirculates laser light 102 that passes through parts 602, 604, which is fanned out by parts 602, 604, back to the weld interface 110. Photon recirculator 606 includes a spherical mirror 608. In the embodiment of FIG. 6, spherical mirror 608 includes opposed first and second half spherical mirrors 610 spaced from each other by space 612 to facilitate the placement of parts 602, 604 in photon circulator 606.

It should be understood that mirrors, waveguides or fiber optics can be used to redirect the infrared laser light. Mirrors have the advantage of high efficiency. Waveguides and fiber optics have the advantage of more flexibility of geometry than the straight lightpaths needed with mirrors. Waveguides and fiber optics have a greater optical acceptance angle than a mirror train, which is useful in an infinite loop arrangement.

The infrared laser light can be redirected to the weld interface for any number of passes. A single additional pass, or a low number of passes has the advantage of simplicity. A large number of passes has the advantage of greater total absorption efficiency by the parts to be welded.

With tubular parts, the coaxial cylindrical mirror arrangement advantageously directs the infrared laser light from all angles to the tubular parts to be welded, and sets up an infinite loop of recirculation which yields a high total absorption of the low absorption absorbers in the weld process.

The mirrors can be metallic, have a high reflection efficiency thin film coating, or be reflective prisms. The waveguides can be either positive transmissive dielectric waveguides of negative reflective waveguides. The fiber optics can be single mode fiber, multimode fiber, selfoc fiber, holey fibers, or hollow fiber.

The plastic parts to be welded can use an infrared absorbing additive at the weld interface, or can use a volume infrared absorber in one (or both) parts. It is assumed, with infrared laser light recirculating, that the infrared absorbers are not total absorbers, so that some of the infrared light escapes from the parts to be welded from the initial pass.

The infrared laser light used in the process can be an infrared laser or a broadband infrared source. A collimated infrared laser is more directable and therefore more applicable with mirrors.

Recirculating the infrared laser light greatly increases the welding efficiency, and allows for welding of parts in a low absorption process, that otherwise could not be welded. Less laser or broadband infrared laser light power needs to be used, thus lowering the cost of the welding machine.

Recirculating infrared laser light with tubular parts both improves the overall absorption of the process, and decreases the complexity of optics needed to deliver infrared light from all angles to the tubular assembly.

What is claimed is:

1. In combination, an infrared laser welding system that laser welds with a low absorption through transmission infrared welding process and low absorptive tubular plastic parts welded thereby, comprising:

the plastic parts including first and second tubular plastic parts with portions to be welded at a weld interface at a junction of the tubular plastic parts where there is low absorbtivity to infrared laser light at the weld interface, with the portion of the first tubular plastic part coaxially surrounding the portion of the second tubular plastic part;

a source of infrared laser light that is directed to the tubular plastic parts to melt the plastic parts at the weld interface;

the tubular plastic parts refracting laser light transiting through the tubular plastic parts without being absorbed by them approximately in a half circle; and a photon recirculator, including a cylindrical mirror that coaxially surrounds the portions of the first and second tubular plastic parts to be welded together that redirects to the weld interface the unabsorbed infrared laser light refracted by the tubular plastic parts.

2. The apparatus of claim 1 wherein the cylindrical mirror redirects the unabsorbed laser light so that the unabsorbed infrared laser light impinges around the tubular plastic parts from all directions.

3. The apparatus of claim 1 including a weld additive disposed at the weld interface, the weld additive having a low absorbtivity to infrared laser light.

4. The apparatus of claim 1 wherein the second tubular part is partially absorptive to the infrared laser light.

* * * * *